United States Patent [19]

Heilman et al.

[11] Patent Number: 4,885,677
[45] Date of Patent: Dec. 5, 1989

[54] AUTOMATIC SYSTEM FOR SEQUENTIAL CONTROL AND FAULT DETECTION OF DEVICES USED IN BATCH PROCESSES

[75] Inventors: Thomas R. Heilman, Willoughby; David M. Norris, Kirtland, both of Ohio

[73] Assignee: The Babcock & Wilcox Company, New Orleans, La.

[21] Appl. No.: 355,143

[22] Filed: May 15, 1989

Related U.S. Application Data

[63] Continuation of Ser. No. 65,976, Jun. 24, 1987, abandoned, which is a continuation-in-part of Ser. No. 887,506, Jul. 21, 1986, abandoned.

[51] Int. Cl.[4] ............................................. G06F 15/00
[52] U.S. Cl. .................................... 364/184; 364/132; 364/141
[58] Field of Search ............... 364/132, 140, 141, 183, 364/184, 185; 371/24–26, 29

[56] References Cited

U.S. PATENT DOCUMENTS

| | | | |
|---|---|---|---|
| 4,347,564 | 8/1982 | Sugano et al. | 364/132 |
| 4,598,379 | 7/1986 | Awane et al. | 364/132 |
| 4,641,243 | 2/1987 | Hartkapf et al. | 364/132 |
| 4,707,778 | 11/1987 | Yamada et al. | 364/132 |

Primary Examiner—Allen MacDonald
Attorney, Agent, or Firm—Vytas R. Matas; Robert J. Edwards

[57] ABSTRACT

An automatic system for sequentially controlling and monitoring for detecting at least two discrete devices used by a batch process. To accomplish this a plurality of device driver blocks are connected on a one to one basis with a plurality of discrete devices. Each driver block receives signals from the discrete device as to its status and sends a control signal to the device to indicate the operation of same. The device driver blocks are monitored by a monitoring function block which establishes status signals to a sequence controller which in turns controls the individual device driver blocks according to the requirements of the batch process.

4 Claims, 3 Drawing Sheets

AUTOMATIC SYSTEM FOR SEQUENTIAL CONTROL AND FAULT DETECTION OF DEVICES USED IN BATCH PROCESSES

This is a continuation of application Ser. No. 07/065,976, Filed June 24, 1987, now abandoned, which was a continuation-in-part of application Ser. No. 06/887,506, Filed July 21, 1986, now abandoned.

BACKGROUND OF THE INVENTION

1. Field of the Invention

The present invention generally relates to systems for control of batch processes and particularly to automatic systems for providing sequential control and fault detection of discrete devices in batch processes.

2. Description of the Prior Art

A batch process is a process that requires the performance of several sequential steps to arrive at a specific result. Once the result has been achieved the batch process stops until the process is again activated from the first step in the sequence.

Several industrial products are manufactured through the use of batch processes. Batch processes play major roles in the pharmaceutical, pulp and paper, and food processing industries.

Each individual step that is part of an industrial batch process requires the operation of several different discrete devices such as motors and on/off valves. These discrete devices then can be broken down into simple apparatus, such as a motor starter contact and the motor itself, or a valve limit switch used by an on/off valve.

Presently, these batch processes have been controlled with distributed process control computer systems such as the Bailey Controls Co. NETWORK 90 system. Such process control systems are made up of control elements that may make up several different control schemes. The control elements are made up of microprocessors which contain several algorithms in their ROM'S (read only memories). Each algorithm is used to preform a logic or control function and is called a function block. Some examples of function blocks include simple logic blocks, such as OR and AND blocks, and complex control blocks, such as a PID (proportional-integral-derivative) controller block. The numerous microprocessor control elements of the computer energize different function blocks to provide numerous control configurations as required.

A present apparatus using a process control computer system for batch control includes the control of discrete devices through conventional function block logic. Controlling the discrete devices through conventional function block logic requires a one to one match between a function block control scheme and each simple apparatus which makes up the discrete devices. The reason for this is that each simple apparatus requires a feedback logic scheme to signal when it has completed its operation. This feedback signal is used to determine if the simple apparatus has malfunctioned and to energize other discrete devices in that particular step of the batch process.

Controlling one discrete device and signaling the operator when a simple apparatus of the device has malfunctioned often requires ten or more function blocks and becomes rather cumbersome. This requires the use of much microprocessor power and is a waste of computer memory space. Also, the time to process the information from the discrete device becomes prolonged due to all the functions required. If the batch process requires the use of several discrete devices, which is often the case, the cost of microprocessor power becomes a big problem.

Another problem associated with using conventional logic to control discrete devices in batch control is that it requires two manual interface buttons. One button is required to set the discrete device in manual or automatic mode and the other is to turn the discrete device on or off. This brings the element of operator error into the system. A batch process uses several discrete devices at one time and having two manual control buttons for each device is difficult for the operator when trying to control the entire process. Also two messages, one for each button, must be sent to the rest of the control system instead of just one for a singular discrete device. This creates a tremendous amount of unnecessary loading upon the distributed computer control system.

Thus it is seen that an automatic system for the control and fault detection of discrete devices used by a batch process is needed which eliminates extensive function block configurations and system loading in distributed process control computer systems.

SUMMARY OF THE INVENTION

The present invention described herein overcomes all the prior art problems associated with process control computers using conventional logic to control discrete devices in sequential batch processes. The invention accomplishes this by providing a new streamlined function block system whereby there is a one to one match up between discrete devices and a new function block unit called a device driver.

This new function block unit provides a control input to and accepts feedback from a discrete field device. The device driver block then determines whether the discrete device is malfunctioning from the feedback and if so alerts the operator. All of these functions are concentrated into one function block that may be called by the batch process instead of the normal ten conventional logic units presently used now because there is no need to monitor the simple apparatus that make up a discrete device. Further, the device driver provides only one output back into the rest of the process control computer system minimizing system loading.

The device driver is part of a new batch process control system which is automatic and uses a minimal amount of microprocessor space and computing time. This system may be implemented in a known distributed process control computer.

Thus one aspect of the invention is to provide an automatic system for controlling discrete devices which eliminates wasted microprocessor power of conventional logic function blocks of distributed control computers.

Another aspect of the present invention is to provide a function block unit capable of unencumbered control of discrete devices used in batch control.

Yet another aspect of the present invention is to provide a function block unit capable of unencumbered control of discrete devices used in batch process control and simplified monitoring of the same.

Yet another aspect of the present invention is to provide a discrete device controlling and monitoring function block unit capable of streamlined communication with the entire distributed process control system through a single communication output.

DESCRIPTION OF PREFERRED EMBODIMENT

Figure 1:
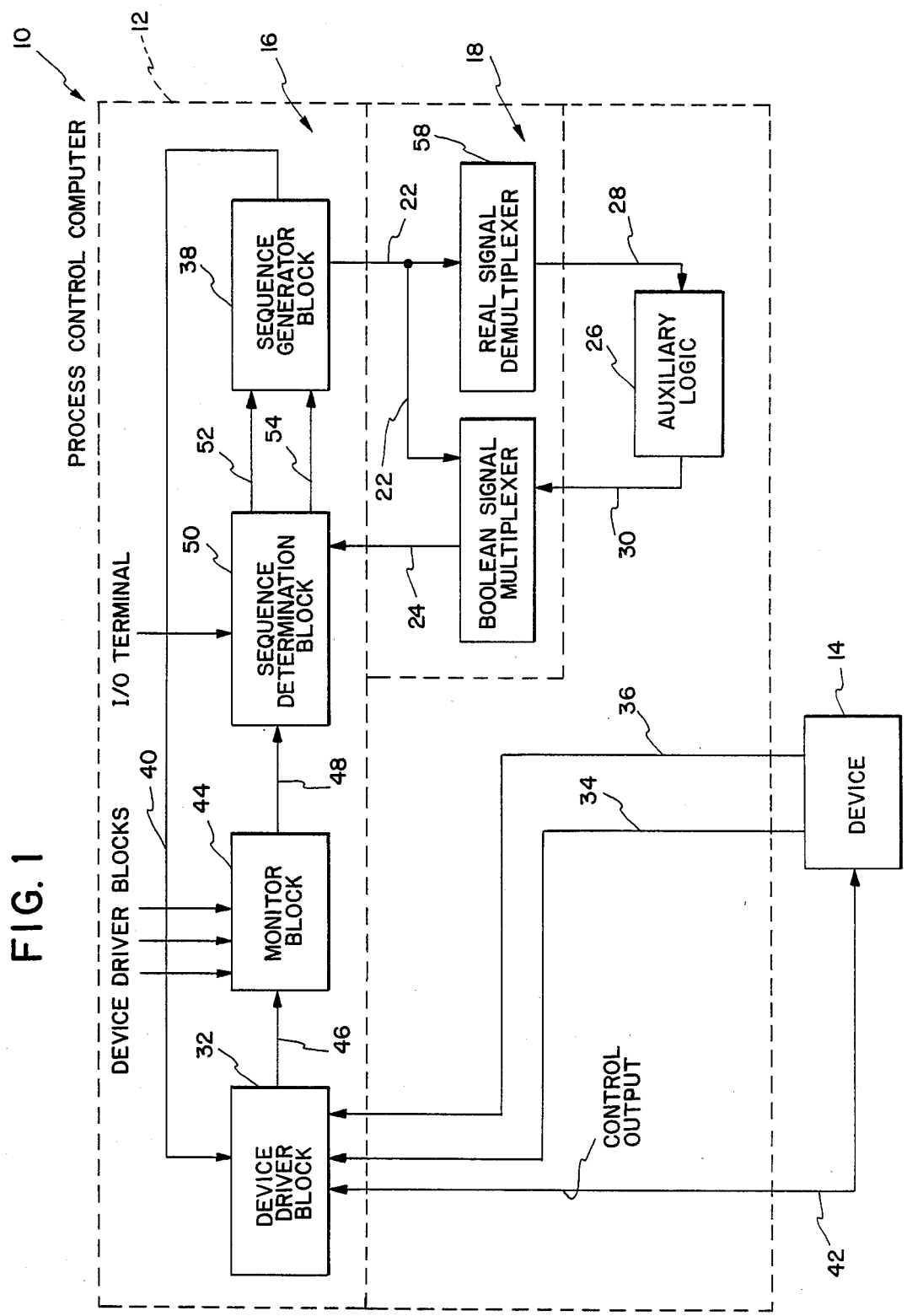
FIG. 1 is a schematic drawing of the automated batch process control system using a device driver function block unit.

Referring now to the drawings generally with particular reference to FIG. 1, an automatic batch process control system 10 is provided including a known process control computer 12, such as a Bailey Controls Co. Model Network 90 control system, and at least one known discrete field device 14, such as an on/off valve with a limit switch.

The computer 12 further includes a field device control system 16, an interface system 18 connected to the field device control system 16 by lines 22 and 24, and an auxiliary logic unit 26 connected to the interface system 18 along lines 28 and 30.

All operations and calculations performed by the computer 12 use algorithms. These algorithms are called function block units because each algorithm performs a specific function. The function block units are microprocessors with internal, unchangeable operation commands to perform the desired function.

More particularly the field device control system 16 includes device driver function block unit 32 which receives two input signals along lines 34 and 36 from the device 14. The device driver block unit 32 also receives an input signal from a sequence generator block 38 along a line 40. The driver block 32 has two output signals, one going to the device 14 along line 42 and another going to a monitor function block unit 44 along a line 46. The monitor block unit 44 sends an output signal along a line 48 to a sequence determination function block unit 50 which sends two outputs along lines 52 and 54 to the sequence generator block unit 38. In an alternative embodiment shown in FIG. 2, the monitor block unit 44 send an output signal along a line 48 to a multiple sequence monitor 51 which sends two outputs along lines 52 and 54 to the sequence generator block unit 38. The monitor 51 controls the execution of block unit 38 and provides a means to change the order in which predefined steps are executed in different recipes. The monitor 51 also allows a step to be manually inserted into the programmed sequence.

The sequence generator block 38 sends an output signal to the interface system 18 along a line 22. The output signal from the sequence generator block 38 is input to both a boolean signal multiplexer 56 and a real signal demultiplexer 58 of the interface system 18. The real signal demultiplexer 58 sends an output signal to the auxiliary logic unit 26 along a line 28 which in turn sends a signal to the boolean signal multiplexer 56 along line 30. The boolean signal multiplexer 56 completes the control loop by sending an output signal to the sequence determination block 50 along line 24.

Figure 2:
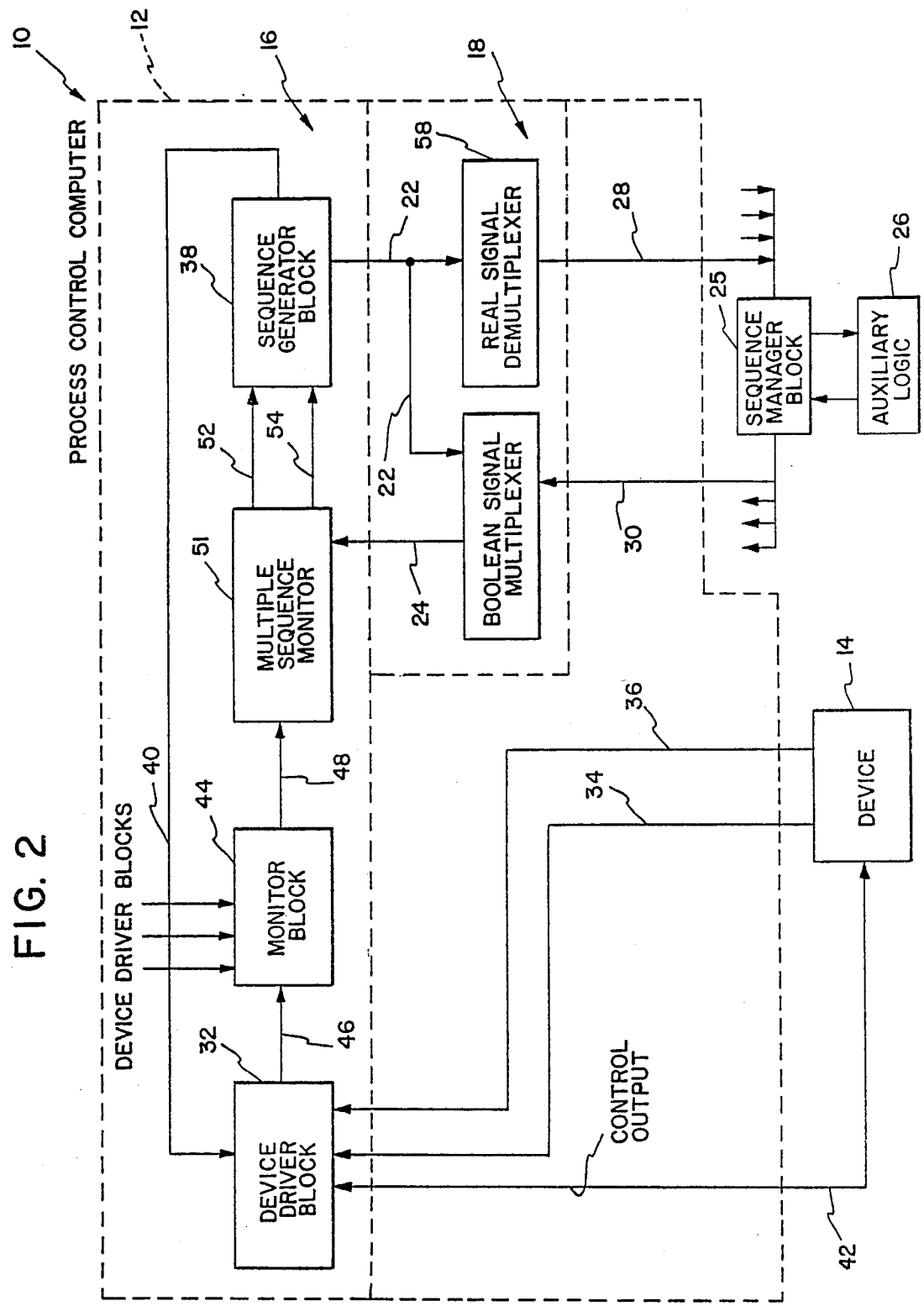
FIG. 2 is a schematic drawing of an alternative embodiment of the automated batch process control system using a device driver function block unit.

In an alternative embodiment shown in FIG. 2, the auxiliary logic unit 26 is shared by a plurality of batch process control systems. In FIG. 2, a sequence manager function code block 25 is interposed between the requests for the use of the auxiliary logic 26 and the block 26 itself. Such requests are processed either according to a first in first out basis or other user defined priority basis.

In operation the field device control system 16 uses two different types of control signals. These control signals are of the standard type used by the various function blocks of the process control computer 12. The first type of control signal is a standard boolean signal which generates either a 1 or a 0, or a high and a low respectively. The second type of control signal is a real signal which may be a whole number or a fraction of a whole number expressed with a floating decimal point.

The device driver block 32 receives a boolean control signal from the sequence generator block along line 40. The device driver 32 then outputs this control signal to the device 14 along line 42. The output to the device 14 is either a 0 or a 1.

The device 14 performs its desired operation corresponding to the control signal, and then generates a boolean feedback signal. The device generates one feedback signal along line 34 and a second feedback signal along line 36. Some devices require the operation of only one feedback signal. These feedback signals determine whether the device 14 completed its operation successfully without a malfunction or breakdown.

The device driver block 32 receives the feedback signals along line 34 and 36 and compares them to a desired boolean feedback mask (not shown). The feedback mask is a two place boolean number and may be 0 0, 0 1, 1 0, or 1 1. The first place in the mask is the desired feedback of the signal on line 34 and the second place in the mask is the desired feedback of the signal on line 36.

The device driver block 32 continuously generates a real output signal along line 46 corresponding to this comparison. If the feedback mask and the feedback signals received from lines 34 and 36 are not equal the device driver will generate a BAD real signal equal to 1.0. If the time for the device 14 to perform the desired operation has not elapsed the device driver block 32 will generate a WAITING real signal equal to 2.0. If the feedback mask 60 is equal to the feedback signals received from lines 34 and 36 the device driver block 32 will generate a GOOD real signal equal to 0.0. The output signal sent along line 46 may also be sent to a CRT monitor (not shown) so that an operator may continuously view the status of the device any may take the necessary action in case of a device malfunction.

The monitor block 44 receives the signal from line 46 and also receives the real output signal from many other device driver blocks used in this step of the process. The monitor block 44 then acts as a specialized logical AND gate. If any inputs to the monitor block 44 from any of its device driver blocks, such as block 46, are WAITING or BAD the monitor block generates a respective WAITING or BAD real output signal along a line 48. If all of the inputs received by the monitor block 44 are GOOD then the output signal generated along line 48 will be GOOD. The signal outputted on line 48 is the status for the entire system of devices, such as device 14, used in that particular step of the process.

The real signal sent along line 48 by the monitor block 44 is received by the sequence determination block 50, which processes this information to arrive at what should be the next step in the batch process. If the signal sent along line 48 indicates that all devices are GOOD the sequence determination block 50 will output the next "normal" step number of the sequence to be used in the batch process. This sequence may be called a recipe. If the signal in line 48 indicates a BAD condition the sequence determination block 50 will output a step number corresponding to a "fault" step. The "fault" step triggers the proper devices in the batch control loop to arrive at a fail-safe condition while shutting down the process.

The sequence determination block 50 outputs this signal, which determines what step should be energized next in the batch process, along line 52 to the sequence generator block. The sequence determination block's 50 output is a real signal. This real signal corresponds to a step in the process. For example if the real signal is a 3.0 it tells the sequence generator block 38 to execute step three of the process.

The sequence determination block 50 also receives a step trigger signal from line 24 sent by the boolean signal multiplexer 56 of the interface system 16. The step trigger signal sent along line 24 energizes the sequence determination block 50 to output the next real output signal corresponding to the next step in the batch process along line 52. The sequence determination block 50 sends this step trigger signal to the sequence generator block 38 along line 54 after it has been received on line 24 and the proper step has been chosen. The step trigger on line 24 and the step trigger on line 54 occur almost simultaneously.

The sequence determination block 50 may also be set in two other special automatic modes by the operator through the I/O computer terminal (not shown). The first mode does not require a step trigger on line 24. In this mode a step trigger may be sent to the sequence generator block 38 through line 54 and the proper step will be chosen and outputted through line 52 when the sequence determination block 50 receives a GOOD signal through line 48. The second special mode does not require a GOOD signal on line 48, and sends the appropriate output signals along line 52 and 54 when it receives the step trigger from line 24.

The sequence determination block 50 can be set in a semi-automatic mode. The semi-automatic mode requires the operator to input an energize signal from an I/O computer terminal (not shown) before the sequence determination block will output the appropriate signals along lines 52 and 54 to get to the next step in the batch process.

Once the sequence generator block 38 receives the step number from the signal through line 52 and the step trigger through line 54 from the sequence determination block 50, it sends a boolean control signal along line 40 corresponding to that particular step number.

The signal sent along line 40 is actually part of a boolean mask outputted by the sequence generator block 38. This boolean mask is different for each step. For instance the first step may have a mask that appears as, 1 0 0 0, and the second step may have a mask that appears as, 0 1 0 0. Each place in the mask is one output to a particular device driver block, such as block 32. Therefore, if the device driver block 32 was controlled by the first place in the mask, the output to device driver 32 is a 1 on the first step and a 0 on the second step of the batch process.

The auxiliary logic unit 26 provides the apparatus to control and set variables that are needed in each step of the batch process. Some of these variables include setpoint control, feedforward control, raw material input, and timing functions. The auxiliary logic unit uses these variables to determine when a step in the batch process is complete.

Auxiliary logic unit 26 is made up of conventional function block units that are used to arrive at the desired variable. There is a separate configuration of function blocks for each step of the batch process in auxiliary logic unit 26. For example, if step 3 was to switch to step 4 when a set point temperature in the process was reached, the conventional function block logic corresponding to step 3 in unit 26 would calculate the set point and sense when this set point was reached. The conventional logic function block configurations are all known process control algorithms.

The sequence determination block 50 and the sequence generator block 38 communicate with the auxiliary logic unit 26 through interface system 18. The interface system 18 determines which step of the process is currently operating, tells the auxiliary logic unit 26 to energize the conventional function block configuration for that step, and outputs a step trigger along line 24 to the sequence determination block 50 when a variable calculated or sensed by the auxiliary logic unit 26 determines that the step is complete.

In operation, the interface system 18 receives a real signal from line 22 in both the boolean signal multiplexer 56 and the real signal demultiplexer 58. The real signal from line 22 corresponds to the current step number which must be executed by the batch process and is an output of the sequence generator block 38. If the sequence determination block determines that step 3 of the batch process is the next step requiring execution then 3.0 is outputted along line 22.

When the real signal demultiplexer receives this real output from line 22 it outputs a boolean mask to the auxiliary logic unit 26 along line 28. There is a different boolean mask for each step number. In the example the boolean mask for step 3 energizes the conventional function block logic needed to execute step 3. Step 3 opens a steam or hot air valve until a desired temperature setpoint is reached.

The conventional function block logic for each step takes up a place in the boolean output from the auxiliary logic unit 26 along line 30. When the conventional function block logic for a step has been completed the place for that step will send a 1 otherwise the place is always zero. When the conventional logic for step 3 indicates that the temperature setpoint has been reached the boolean output on line 30 to the boolean signal multiplexer 56 will look like:

00100000

The boolean signal multiplexer 56 receives the real signal from line 22 and the boolean signal from line 30. The multiplexer 56 then outputs a step trigger signal on line 24 if the place in the boolean input corresponding to the real input goes from a 0 to a 1. In the example the multiplexer receives 3.0 as a real input from line 22. When the boolean input from the auxiliary logic unit appears as shown above the boolean signal multiplexer will send a step trigger on line 24. The step trigger tells the sequence determination block 50 to go to the next step of the batch process.

Figure 3:
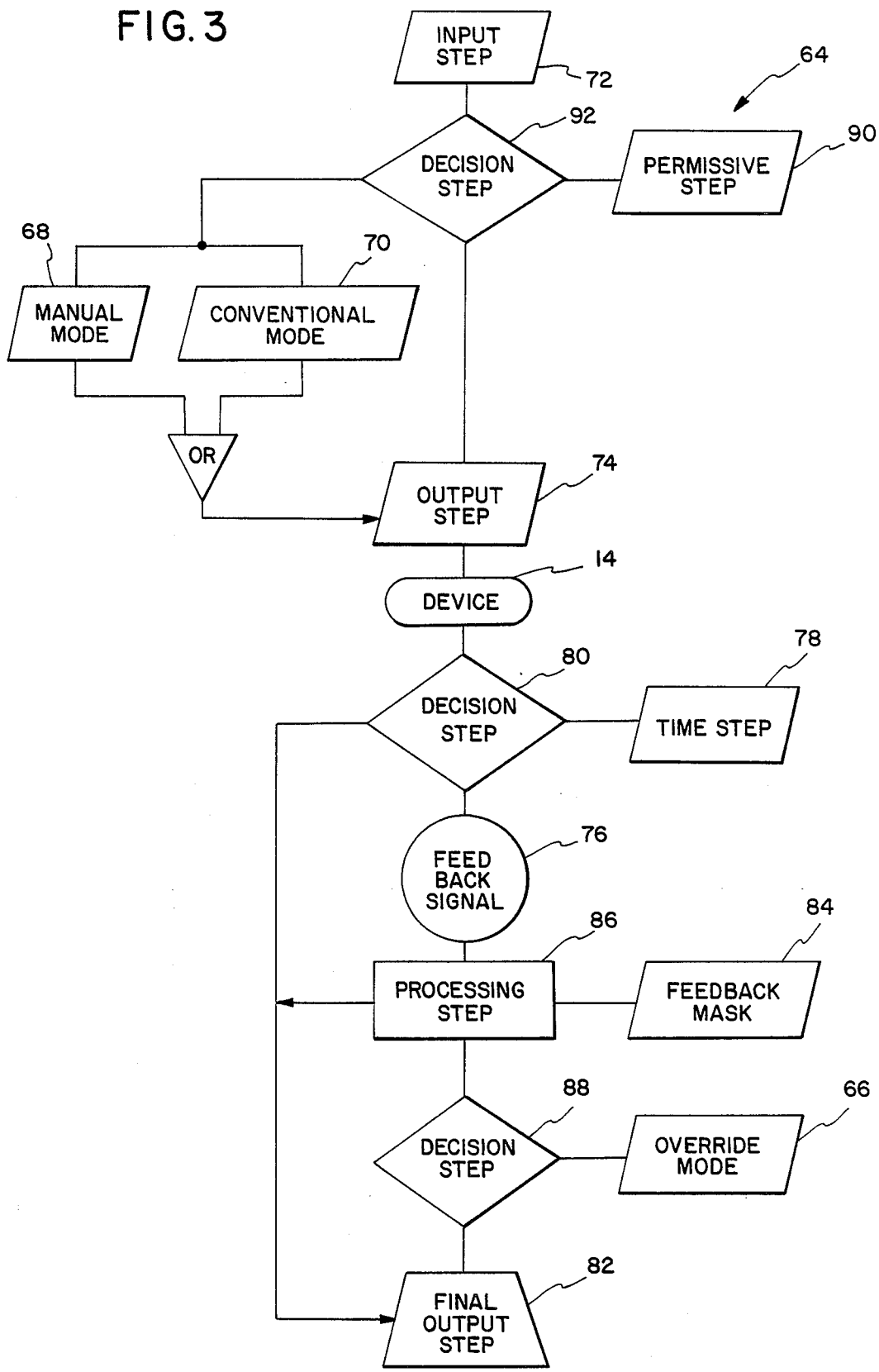
FIG. 3 is a schematic of the control algorithm for the device driver function block unit of FIG. 1 and FIG. 2.

Referring now to FIG. 3, a flow chart 64 for the algorithm of the device driver block 32 is provided. The different shaped boxes in flow chart 64 represent steps in the device driver block algorithm, and will be referred to as steps or modes. The flow chart 64 includes several specialized modes in which the device driver block 32 may be set by an operator through I/0 terminal. These specialized modes include an override mode 66, a manual input mode 68, and a conventional function block input mode 70.

In normal operation, as embodied in FIG. 1 the device driver block 32 receives a boolean input from the sequence generator block 38 along line 40. This boolean input is symbolized in FIG. 2 by an input step 72. The boolean input is transferred to an output step 74 and is output to the device 14.

The device 14 sends a feedback signal 76 in boolean form back to the flow chart 64 after a time step 78. Until the time step 78 has elapsed a first decision step 80 sends a real signal 2.0 to a final output step 82. The real signal 2.0 denotes WAITING.

After time step 78 has elapsed the feedback signal 76 is compared to a desired feedback mask 84 in a processing step 86. If the feedback signal 76 is equal to the feedback mask 84 processing step 86 sends a GOOD signal equal to a real 0.0 to the output step 82. If the feedback signal 76 is not equal to the feedback mask 84 processing step 86 sends a BAD signal equal to a real 1.0 to the output step 82. When output step 82 receives any real signal it sends this information to the remainder of the batch control system 10 on line 46.

If the override mode 66 is energized by the operator a boolean signal 1 will be sent to a second decision step 88. If the second decision step 88 receives a boolean 1 from the override mode 66 a GOOD signal will always be sent to the output step 82 when time step 8 has elapsed. Any BAD signal from processing step 86 will be overridden and changed to a GOOD signal. This mode is used when the operator determines that the malfunction in device 14 determined by feedback signal 76 is insignificant and does not want to shut down the entire batch process because of it.

If the operator wishes to operate the device 14 in the manual mode 68 or the conventional logic input mode 70 a permissive step 90 will output a boolean 1 to a third decision step 92. If decision step 92 receives a boolean 1 it will allow the manual mode 68 or the conventional logic mode 70 to be send a control signal to output step 74. Either of the modes 68 or 70 can be used by the operator to control device 14 after a failure of any portion of process control computer 12 has been detected or for any other reason.

While specific embodiments of the invention have been shown and described in detail to illustrate the application of the principles of the invention, it will be understood that the invention may be embodied otherwise without departing from such principles.

What is claimed is:

1. A device driver function block unit (32) for controlling and monitoring the operation of a discrete device (14), comprising:
   means for receiving a boolean control signal (40);
   means for outputting (42) and control signal to said discrete device (14);
   means for receiving a feedback signal (34, 36) from said discrete device (14);
   means (Boolean Mask) for providing a reference signal;
   means for comparing said feedback signal (34, 36) with said reference signal (Boolean Mask) to determine whether the discrete device (14) completed its operation successfully without a malfunction or breakdown; and
   means for continuously outputting (Boolean Filter) a real signal (46) indicative of the operating status of said discrete device (14) based on said comparison.

2. A method for controlling and monitoring a discrete device (14), comprising:
   receiving a boolean control signal (40, 32);
   outputting said control signal (32, 42) to said discrete device (14);
   receiving a feedback signal (34, 36) from said discrete device (14);
   comparing said feedback signal (34, 36) to a desired boolean feedback mask to determine whether the discrete device (14) completed its operation successfully without a malfunction or breakdown; and
   continuously outputting a real output signal (46) based on said comparison step indicative of the status of said discrete device (14).

3. An automatic system (10) for sequentially controlling and continuously monitoring at least two discrete devices (14) used to control a batch process which requires the performance of several sequential steps, comprising:
   at least two device driver function block means (32), matched up one to one with said discrete devices (14), for controlling and monitoring said discrete devices (14);
   monitor block means (44), connected to said device driver function block means (32), for outputting first signal (48) indicative of the status of said discrete devices (14);
   multiple sequence monitor means (51), connected to said monitor block means (44), for outputting signals (52, 54) to a sequence generator block means (38) to change the order in which said steps are executed in different recipies and to allow a step to be manually inserted into said sequence; and
   sequence generator block means (38), connected to said multiple sequence monitor means (51), for sending a boolean control signal (40) to said device driver function block means (32) to control said discrete devices (14).

4. A system (10) according to claim 3, further comprising:
   means for providing a real signal (22) from said sequence generator block means (38), corresponding to a current step number which must be executed by said batch process, to a boolean signal multiplexer (56) and a real signal demultiplexer (58);
   sequence manager function code block means (25), connected to an auxiliary logic unit means (26), said boolean signal multiplexer (56) and said real signal demultiplexer (58) for processing requests for the use of said auxiliary logic unit means (26) according to a first in first out basis or other user defined priority basis; and
   means for outputting a step trigger signal (24), from said boolean signal multiplexer (56) to said multiple sequence monitor means (51), indicative of the next step of said batch process.

* * * * *